(12) United States Patent
Chen et al.

(10) Patent No.: US 10,250,737 B2
(45) Date of Patent: Apr. 2, 2019

(54) TERMINAL FUNCTION SETTING METHOD AND DEVICE FOR VEHICLE UNLOCKING, AND MOBILE TERMINAL

(71) Applicant: BEIJING MOBIKE TECHNOLOGY CO., LTD., Beijing (CN)

(72) Inventors: Chaochao Chen, Beijing (CN); Xiaolong Wang, Beijing (CN)

(73) Assignee: BEIJING MOBIKE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/689,331

(22) Filed: Aug. 29, 2017

(65) Prior Publication Data

US 2018/0302511 A1   Oct. 18, 2018

(30) Foreign Application Priority Data

Apr. 18, 2017 (CN) .......................... 2017 1 0254196

(51) Int. Cl.
*H04M 1/72* (2006.01)
*H04M 1/725* (2006.01)
(Continued)

(52) U.S. Cl.
CPC ......... *H04M 1/72569* (2013.01); *B60R 25/20* (2013.01); *B60R 25/305* (2013.01); *G06Q 10/00* (2013.01); *G06Q 30/0645* (2013.01); *G07C 9/00309* (2013.01); *H04L 29/08567* (2013.01); *H04M 1/7253* (2013.01); *H04M 1/72533* (2013.01); *H04W 4/40* (2018.02); *G07C 2009/00539* (2013.01); *H04W 4/027* (2013.01); *H04W 4/80* (2018.02); *H04W 84/12* (2013.01)

(58) Field of Classification Search
CPC .. H04M 1/72569; B60R 25/20; B60R 25/305; G06Q 10/00; G06Q 30/0645
USPC .................................................. 340/5.7–5.74
See application file for complete search history.

(56) References Cited

U.S. PATENT DOCUMENTS 6,405,033 B1 *   6/2002   Kennedy, III ........... H04M 3/51
                                                          455/414.1
6,535,743 B1 *   3/2003   Kennedy, III ... G08G 1/096872
                                                          340/988

(Continued)

FOREIGN PATENT DOCUMENTS

CN           105046827 A        11/2015
CN           105574457 A         5/2016
(Continued)

OTHER PUBLICATIONS

State Intellectual Property Office of the P.R.C., Search Report for Application No. 201710254196.0, dated Dec. 4, 2017, 1 page, China.

(Continued)

*Primary Examiner* — Allen T Cao
(74) *Attorney, Agent, or Firm* — Alston & Bird LLP (57) ABSTRACT

Described is a terminal function setting method and device for vehicle unlocking, and a mobile terminal. The method comprises: receiving a current request for vehicle unlocking sent by a mobile terminal; determining to perform a scene mode of the current request; acquiring a terminal function setting manner under the scene mode; and performing function setting of the mobile terminal according to the terminal function setting manner.

13 Claims, 5 Drawing Sheets

(51) Int. Cl.
  *G07C 9/00* (2006.01)
  *B60R 25/30* (2013.01)
  *B60R 25/20* (2013.01)
  *G06Q 30/06* (2012.01)
  *G06Q 10/00* (2012.01)
  *H04L 29/08* (2006.01)
  *H04W 4/40* (2018.01)
  *H04W 84/12* (2009.01)
  *H04W 4/80* (2018.01)
  *H04W 4/02* (2018.01)

(56) References Cited

U.S. PATENT DOCUMENTS

| | | | | |
|---|---|---|---|---|
| 2009/0091477 | A1* | 4/2009 | McCall | G01S 19/42 |
| | | | | 340/990 |
| 2014/0218529 | A1* | 8/2014 | Mahmoud | H04N 7/181 |
| | | | | 348/148 |
| 2017/0105101 | A1* | 4/2017 | Santavicca | H04B 17/27 |
| 2018/0018840 | A1 | 1/2018 | Xia et al. | |

FOREIGN PATENT DOCUMENTS

| | | |
|---|---|---|
| CN | 106251495 A | 12/2016 |
| EP | 3086259 A1 | 10/2016 |

OTHER PUBLICATIONS

State Intellectual Property Office of the P.R.C., First Office Action for Application No. 201710254196.0, dated Dec. 12, 2017, 16 pages, China.

State Intellectual Property Office of the P.R.C., Second Office Action for Application No. 201710254196.0, dated Mar. 15, 2018, 6 pages, China.

State Intellectual Property Office of the P.R.C., Third Office Action for Application No. 201710254196.0, dated Jul. 2, 2018, 17 pages, China.

State Intellectual Property Office of the P.R.C., Decision of Rejection for Application No. 201710254196.0, dated Sep. 28, 2018, 5 pages, China.

* cited by examiner

TERMINAL FUNCTION SETTING METHOD AND DEVICE FOR VEHICLE UNLOCKING, AND MOBILE TERMINAL

CROSS-REFERENCE TO RELATED APPLICATIONS

This application claims priority to and the benefit of Chinese patent application No. 201710254196.0, filed on Apr. 18, 2017, the contents of which as are incorporated herein by reference in their entirety.

BACKGROUND

Related Field

The present invention relates to the technical field of vehicle unlocking, and more particularly to a terminal function setting method for vehicle unlocking, a terminal function setting device for vehicle unlocking, and a mobile terminal.

Description of Related Art

When a user unlocks a vehicle via a mobile terminal, he/she needs to manually set the functions of the mobile terminal, such as a flashlight function, according to the use requirements. This adds complexity to the operations of vehicle unlocking. In addition, the set functions may not be optimally matched with the current environment. As a result, it will reduce the user experience.

Therefore, there is a demand in the art that a new solution for a terminal function setting method for vehicle unlocking shall be proposed to address at least one of the problems in the prior art.

BRIEF SUMMARY

One exemplary and non-limiting object of this invention is to provide a new technical solution for automatically performing terminal function setting when unlocking a vehicle.

According to a first aspect of the present invention, there is provided a terminal function setting method for vehicle unlocking. The method comprises: receiving a current request for vehicle unlocking sent by a mobile terminal; determining to perform a scene mode of the current request; acquiring a terminal function setting manner under the scene mode; and performing function setting of the mobile terminal according to the terminal function setting manner.

Alternatively or optionally, determining the scene mode of the current request comprises: acquiring at least one detection item for determining the scene mode; and detecting based on a priority level of the detection item to determine the scene mode.

Alternatively or optionally, the scene mode includes a night mode, and a terminal function setting manner under the night mode includes activating a flashlight function of the mobile terminal.

Alternatively or optionally, the terminal function setting manner under the night mode further includes a setting manner of camera parameters.

Alternatively or optionally, determining to perform the scene mode of the current request comprises: determining the scene mode based on a light intensity, when the light intensity is lower than or equal to a preset intensity threshold, the scene mode is determined as a night mode, and a terminal function setting manner under the night mode includes activating a flashlight function of the mobile terminal.

Alternatively or optionally, determining to perform the scene mode of the current request comprises: determining the scene mode based on a time, wherein when a current time is a preset night time, the scene mode is determined as a night mode, and a terminal function setting manner under the night mode includes activating a flashlight function of the mobile terminal.

Alternatively or optionally, determining to perform the scene mode of the current request comprises: acquiring record information of vehicle unlocking performed by the mobile terminal, the record information including a vehicle unlocking time and a scene mode used when a vehicle is unlocked; and determining the scene mode based on the record information and a current time.

Alternatively or optionally, determining to perform the scene mode of the current request comprises: acquiring a time when a function setting of the mobile terminal is performed last time as the last time; calculating a time interval between a current time and the last time; and when the time interval is lower than or equal to a preset time threshold, taking a scene mode of the last request as the scene mode of the current request.

According to the second aspect of the present invention, there is also provided a terminal function setting device for vehicle unlocking. The device comprises: a receiving module configured for receiving a current request for vehicle unlocking sent by a mobile terminal; a scene mode determining to perform module configured for determining a scene mode of the current request; a setting manner acquiring module configured for acquiring a terminal function setting manner under the scene mode; and an executing module configured for performing function setting of the mobile terminal according to the terminal function setting manner.

Alternatively or optionally, the scene mode determining module includes: a detection item acquiring unit configured for acquiring at least one detection item for determining the scene mode; and a detecting unit configured for detecting based on a priority level of the detection item to determine the scene mode.

Alternatively or optionally, the scene mode determining module is configured for determining the scene mode based on a light intensity, when the light intensity is lower than or equal to a preset intensity threshold, the scene mode determining module determines the scene mode as a night mode, and a terminal function setting manner under the night mode includes activating a flashlight function of the mobile terminal.

Alternatively or optionally, the scene mode determining module is configured for determining the scene mode based on a time, when a current time is a preset night time, the scene mode determining module determines the scene mode as a night mode, and a terminal function setting manner under the night mode comprises activating a flashlight function of the mobile terminal.

Alternatively or optionally, the scene mode determining module includes: a record information acquiring unit configured for acquiring record information of vehicle unlocking performed by the mobile terminal, the record information including a vehicle unlocking time and a scene mode in which a vehicle is unlocked; and a scene mode determining unit configured for determining the scene mode based on the record information and a current time.

Alternatively or optionally, the scene mode determining module includes: a time acquiring unit configured for acquiring a time when a function setting of the mobile terminal is performed last time as the last time; a calculating unit configured for calculating a time interval between a current time and the last time; and a scene mode determining unit configured for, when the time interval is lower than or equal to a preset time threshold, taking a scene mode of the last request as the scene mode of the current request.

According to the third aspect of the present invention, there is provided a terminal function setting device for vehicle unlocking, comprising: a memory and a processor, wherein the memory stores instructions for controlling the processor to perform the terminal function setting method according to the first aspect of the present invention.

According to the fourth aspect of the present invention, there is provided a mobile terminal comprising the terminal function setting device according to the second or third aspect of the present invention.

One advantageous effect of the present invention is that, using the terminal function setting method for vehicle unlocking, the terminal function setting device for vehicle unlocking, and the mobile terminal of the present invention, after receiving a current request for vehicle unlocking sent by the mobile terminal, by determining a scene mode of the current request, the function setting of the mobile terminal can be automatically performed according to the terminal function setting manner bound to the determined scene mode. Thus, the user does not need to manually set the function setting of the mobile terminal, and the user experience is improved.

Further features of the present invention and advantages thereof will become apparent from the following detailed description of exemplary embodiments according to the present invention with reference to the attached drawings.

BRIEF DESCRIPTION OF THE SEVERAL VIEWS OF THE DRAWINGS

The accompanying drawings, which are incorporated in and constitute a part of the specification, illustrate embodiments of the invention and, together with the description thereof, serve to explain the principles of the invention.

The drawings that are integrated into the description and constitute a part of the description show the embodiments of the present invention and are intended to explain the principle of the invention together with the descriptions thereof.

Having thus described the invention in general terms, reference will now be made to the accompanying drawings, which are not necessarily drawn to scale, and wherein:

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Still further, to facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Additionally, techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

<Overall Structure of a Shared Vehicle System>

Figure 11:
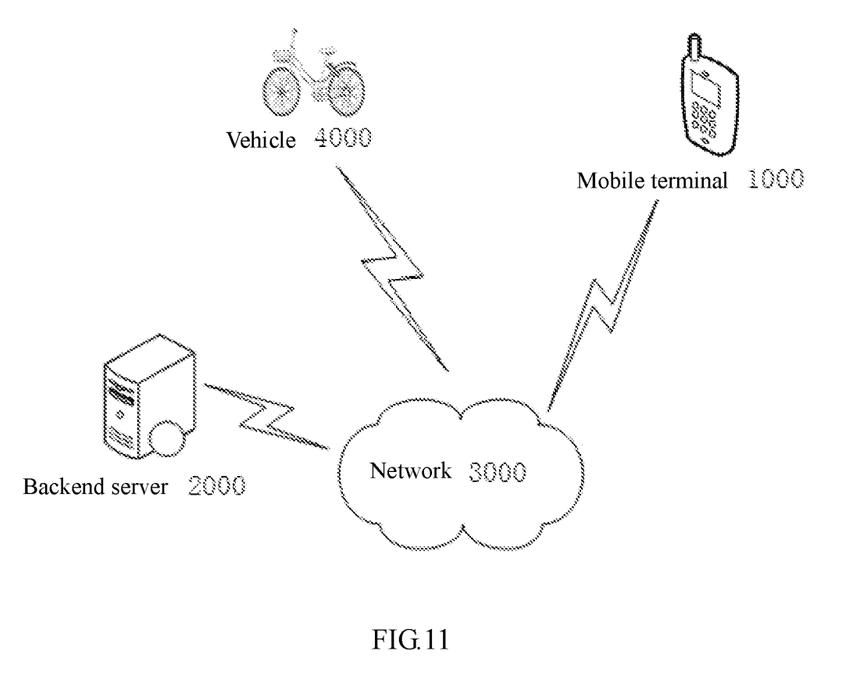
FIG. 11 is a schematic diagram of the overall structure of a shared vehicle system according to an embodiment of the present invention.

FIG. 11 is a schematic drawing of the overall structure of a shared vehicle system according to an embodiment of the present invention.

As shown in FIG. 11, the shared vehicle system may include a mobile terminal 1000, a backend server 2000 and a vehicle 4000, the three of which may establish communication connections with one another via a wireless network 3000.

The vehicle 4000 includes a two-dimensional code and/or a code for uniquely identifying a corresponding vehicle.

The user may scan the two-dimensional code of the vehicle 4000 via the mobile terminal 1000, and send the two-dimensional code information to the backend server 2000 to perform an unlocking operation.

The user may also input or recognize the code of the vehicle 4000 via the mobile terminal 1000, and send the code information to the backend server 2000 to perform an unlocking operation.

When the user scans the two-dimensional code of the vehicle 4000 or input the code thereof via the mobile terminal 1000, the user needs to use a function of the mobile terminal 1000, such as a flashlight function or a camera function of the mobile terminal 1000.

In the present invention, the mobile terminal 1000 may send or receive signals via a wired or wireless network for example, or may process the signals in a memory for example, or store the signals as a physical storage state. Each mobile terminal may be an electronic device including hardware, software or an inbuilt logic assembly or two or more of such assemblies, and may be used to execute suitable functions implemented or supported by the mobile terminal. For example, the mobile terminal may be a smart cell phone, a tablet computer, a portable email device, an electronic book, a handheld gaming machine and/or game controller, a notebook computer, an Internet surfing computer, a handheld electronic device, a smart wearable device or the like. The present invention covers any suitable mobile terminal. The mobile terminal may enable its user to access a network.

The mobile terminal 1000 may include a processing device including a processing part and a radio frequency/digital signal processor, and may include a memory device including a ROM, a RAM, a flash memory or any combination thereof.

In addition, various client applications may be installed in the mobile terminal 1000 to allow the mobile terminal 1000 to transmit commands suitable for operations with other devices. Such applications may be downloaded from a server and may be installed in the memory of or pre-installed in the mobile terminal 1000. In the present invention, the mobile terminal 1000 is installed with a vehicle client terminal application which can help the user use the functions of the vehicle 4000.

In the present invention, the backend server 2000 is a server. The server in this description should be understood as a service point providing processing, database and communication facilities. For example, the server may be a single physical processor including related communication, data storage and database facilities, or a networked or clustered processor, or a cluster of related networks and storage devices, and can operate software, one or more database and application software providing services supported by the server. The servers may vary greatly in configuration or performance, but generally the server may include one or more central processing units and memories. The server further include one or more large-volume storage devices, one or more power sources, one or more wired or wireless network interfaces, one or more input/output interfaces, one or more operating systems such as Windows Server, Mac OS X, Unix, Linux and FreeBSD, and the like. Specifically, the backend server 2000 may be an integral server or distributed servers across multiple computers or computer data centers. The server may be various types, such as but not limited to a network server, a news server, a mail server, a message server, an advertisement server, a file server, an application server, an interactive server, a database server or a proxy server. In some embodiments, each server may include hardware, software or an inbuilt logic assembly or two or more of such assemblies used to execute suitable functions supported or achieved by the server. In the present invention, the backend server 2000 is used to provide all functions required for using the vehicle.

In the present invention, the vehicle 4000 may be a bicycle, a tricycle, an electric scooter, a motor cycle, a four-wheeled vehicle or the like.

In the present invention, the wireless network 3000 covers any suitable wireless network, such as but not limited to a 4G network, a 3G network, a GPRS network, a Wi-Fi network or the like. In addition, the wireless network coupling the backend server 2000 and the mobile terminal 1000 and the wireless network coupling the backend server 2000 and the vehicle 4000 may be the same or different.

<Methods>

Figure 1:
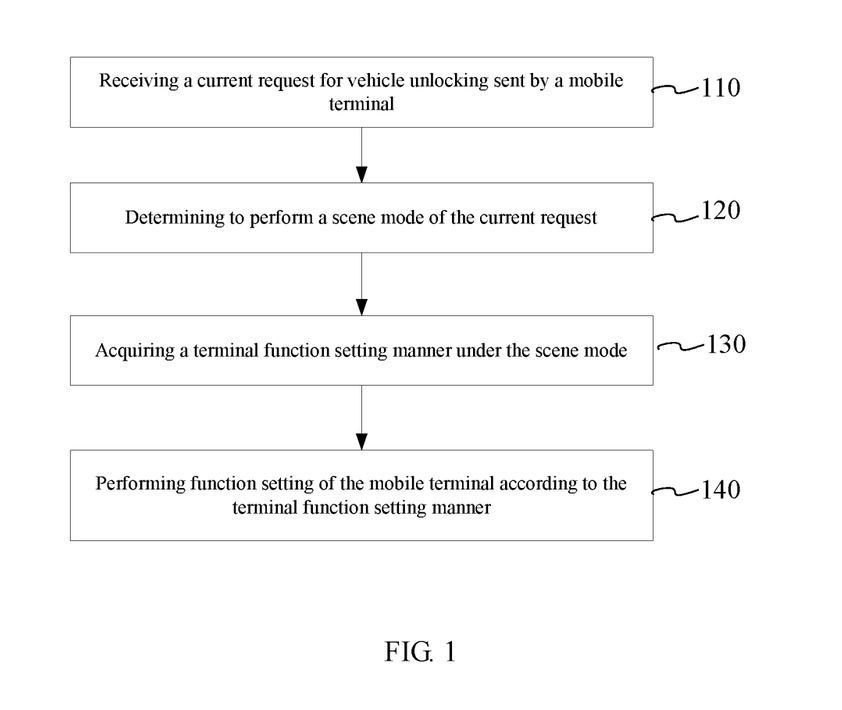
FIG. 1 is a schematic diagram of a flow chart of the terminal function setting method according to an embodiment of the present invention.

FIG. 1 is a schematic drawing of a flow chart of the terminal function setting method for vehicle unlocking according to an embodiment of the present invention.

As shown in FIG. 1, the terminal function setting method of the present invention includes the following steps.

Step S110, the current request for the vehicle unlocking sent by the mobile terminal is received, and then step S120 is executed.

The mobile terminal is installed with an application for vehicle unlocking.

Vehicle unlocking may include scanning a two-dimensional code, inputting a vehicle code and the like.

For the step S110, the user may trigger the current request using the above application.

Take a shared bicycle as an example. When the user unlocks the vehicle, he/she may open a shared bicycle application in the mobile terminal, and trigger the current request by clicking an unlocking button in the application.

Step S120 a scene mode of the current request is determined to perform.

After the application receives the current request, vehicle unlocking is performed by the means of using the mobile terminal. Thus, the operation needs to activate the functions of the mobile terminal.

These functions include a camera function, a flashlight function, a wireless communication function and the like, for example.

Functions required to be activated, further the setting of function parameters, and the like are different in different external environments, so that the scene mode is bound to a corresponding terminal function setting manner, avoiding manually setting mobile terminal function by the user according to the external environments.

The scene mode includes, for example, a night mode.

A terminal function setting manner under the night mode includes, for example, activating a flashlight function of the mobile terminal.

The terminal function setting manner under the night mode may also include, for example, a setting manner of camera parameters. The camera parameters include, for example, a focal length, an aperture, a flashlight, and the like.

The scene mode may also include, for example, a day mode.

A terminal function setting manner under the day mode includes, for example, deactivating the flashlight function of the mobile terminal.

The terminal function setting mode under the day mode may also include, for example, a setting manner of camera parameters.

The scene mode may also include, for example, a high light mode, a low light mode, and the like. A light intensity of the high light mode is higher than that of the day mode, and a light intensity of the low light mode is lower than that of the day mode but higher than that of the night mode.

Figure 2:
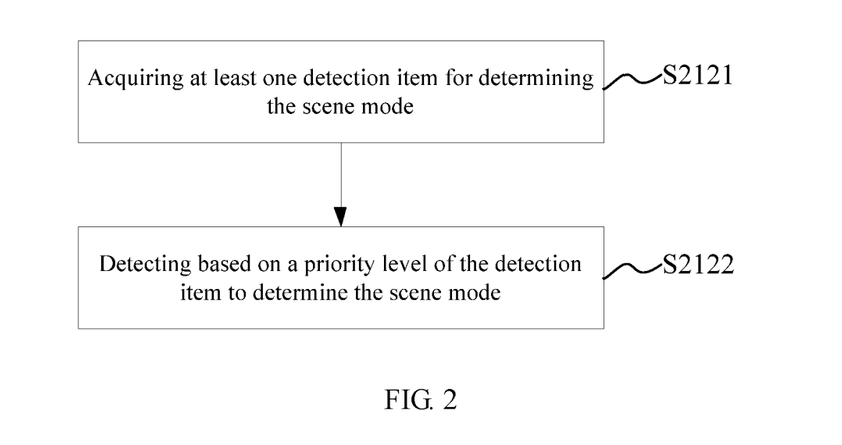
FIG. 2 is a schematic drawing of a flow chart of determining to perform a scene mode of the current request in FIG. 1.

FIG. 2 is a schematic drawing of a flow chart of determining to perform the scene mode of the current request in an application.

According to FIG. 2, the step S120 may further include the following steps.

In step S2121, at least one detection item for determining the scene mode is acquired.

In this application, at least one detection item may be set to determine the scene mode.

The at least one detection item includes, for example, a light intensity detection, a time detection, a history record detection, and a time interval detection between the current time and the last time for function setting of the mobile terminal.

In step S2122, the detection is performed based on a priority level of the acquired detection item, so as to determine the scene mode.

In order to improve the efficiency of determining the scene mode of the current request by the means of detection, it is possible to set different priority levels for the all detection items.

The priority level of each detection item may adopt a default setting, or may be set according to a user presetting.

An example in which the priority level of the time interval detection item is set to be the highest is taken. In step S2122, first, the time interval is detected; if the scene mode of the current request can be determined to perform based on the above detection, no other detection is performed; or otherwise, the next priority level is continued to be detected.

In another embodiment, it is also possible to detect all items sequentially or simultaneously after at least one detection item for determining the scene mode is acquired, and then the scene mode of the current request is comprehensively determined based on a detection result of each item.

The above-described comprehensive determination manner is performed by, for example, taking a majority of the detection results as the scene mode of the current request.

The above-described determining to perform the scene mode of the current request based on a light intensity may include determining the scene mode as a night mode when the light intensity is lower than or equal to a preset intensity threshold.

The above-described determining to perform the scene mode of the current request based on the light intensity may include determining the scene mode as a day mode when the light intensity is higher than the preset intensity threshold.

The light intensity may be determined based on the light intensity data collected by a light sensor and the like.

The light intensity may also be determined based on an image of an external environment shot by a camera. The above-described determining to perform the scene mode of the current request based on a time may include: determining the scene mode as a night mode when the current time is a preset night time.

The preset night time may be a default setting, or may be preset by a user.

The above-described determining to perform the scene mode of the current request based on a time may also include: determining the scene mode as a day mode when the current time is a preset day time.

The preset day time may be a default setting, or may be set by the user.

Figure 3:
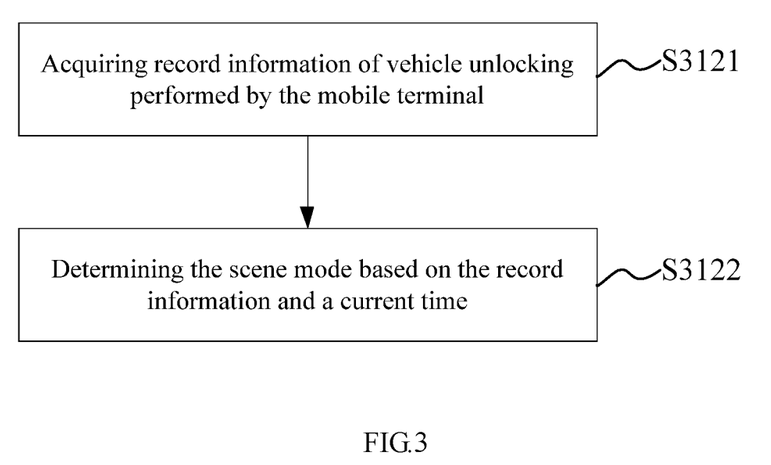
FIG. 3 is a schematic diagram of detection flow chart of history record detection for determining to perform a scene mode of the current request.

According to FIG. 3, the above-described determining to perform the scene mode of the current request based on a history record may comprise the following steps.

In step S3121, record information of vehicle unlocking performed by a mobile terminal is acquired, wherein the record information includes a vehicle unlocking time and a scene mode when a vehicle is unlocked.

In step S3122, the scene mode of the current request is determined based on the record information and the current time.

Step S3122 may further include: determining to perform the scene mode of the current request based on the record of an unlocking time closest to the current time when there is no record matched with the current time in the record information.

Figure 4:
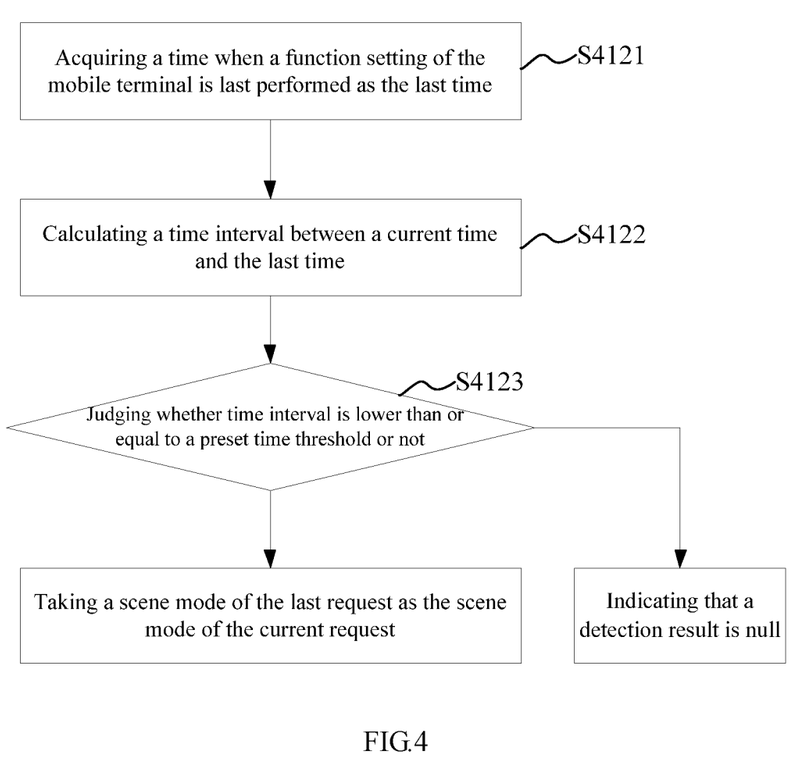
FIG. 4 is a schematic diagram of detection flow chart of interval detection for determining to perform a scene mode of the current request.

As shown in FIG. 4, the above-described determining to perform the scene mode of the current request based on a time interval may comprise the following steps.

In step S4121, the time when a function setting of the mobile terminal is last performed is acquired as the last time.

The last time is the time when the function setting of the mobile terminal is performed according to a terminal function setting manner under the determined scene mode of the last request.

Information of the function setting of the mobile terminal last time includes, for example, a time, a corresponding scene mode, and the like, and may be recorded and stored.

In step S4122, a time interval between the current time and the last time is calculated.

In step S4123, whether the time interval is lower than or equal to a preset time threshold is judged. If so, the scene mode of the last request is used as the scene mode of the current request; or if not, the detection is exited.

The time threshold may be set, for example, in a range from 5-60 minutes; or it is acceptable that the time threshold may be preset by a user.

In addition, in an embodiment in which unlocking is implemented by using the mobile terminal to scan a two-dimensional code, the above-described determining to perform the scene mode of the current request may include: enabling two-dimensional code scanning for unlocking; previewing an image of the sampled two-dimensional code by a camera in a scanning code frame; and determining the corresponding scene mode based on a preprocessing result of the image.

By determining the corresponding scene mode based on the preprocessing result, function setting of a camera can be realized. The function setting refers to, for example, a focus length during focusing, a focus cycle during focusing, whether or not to automatically turn on image stabilization, a sampling resolution and the like. For example, the corresponding scene mode may be determined based on a contour width, definition and the like of the two-dimensional code in the preprocessing result.

In step S130, a terminal function setting manner under the scene mode is acquired.

In step S140, function setting of the mobile terminal is performed according to the acquired terminal function setting manner For example, the scene mode determined in step S120 is the night mode; and the terminal function setting manner under the night mode includes activating a flashlight function of the mobile terminal and setting camera parameters. Thus, in step S140, the flashlight function is automatically activated, and the camera parameters under the night mode are automatically set.

Example 1

A user triggers a first request for unlocking a vehicle by a mobile terminal; and an application determines a scene mode of the first request as a night mode and performs function setting of the mobile terminal for the first time according to a terminal function setting manner under the night mode.

After the user unlocks the vehicle according to the first request, he/she finds that the current vehicle is damaged and thus, has to select another vehicle to perform vehicle unlocking for the second time; or he/she finds that that the current vehicle unlocking failed, and thus has to perform vehicle unlocking for the second time. Then, the user triggers a second request for unlocking a vehicle by the mobile terminal; after receiving the second request, the application first detects and calculates a time interval between the current time and the time when the function setting of the mobile terminal is performed for the first time based on the above time interval, and directly uses the night mode as the scene mode of the second request since the time interval is lower than a preset time threshold.

Example 2

Following the example 1, if it is determined that the time interval is greater than the preset time threshold when the time interval is detected, the time interval detection is exited and the next priority level detection, such as light intensity detection, is continued based on the priority level in order to perform the scene mode of the second request.

Example 3

Following the example 1, if it is determined that the time interval is greater than the preset time threshold when the time interval is detected, the time interval detection is exited and the above-mentioned light intensity detection, the time detection and the history detection are performed; and the scene mode of the second request is determined as the night node if the detection results of both the light intensity detection and the time detection are night modes.

<Device>

Figure 5:
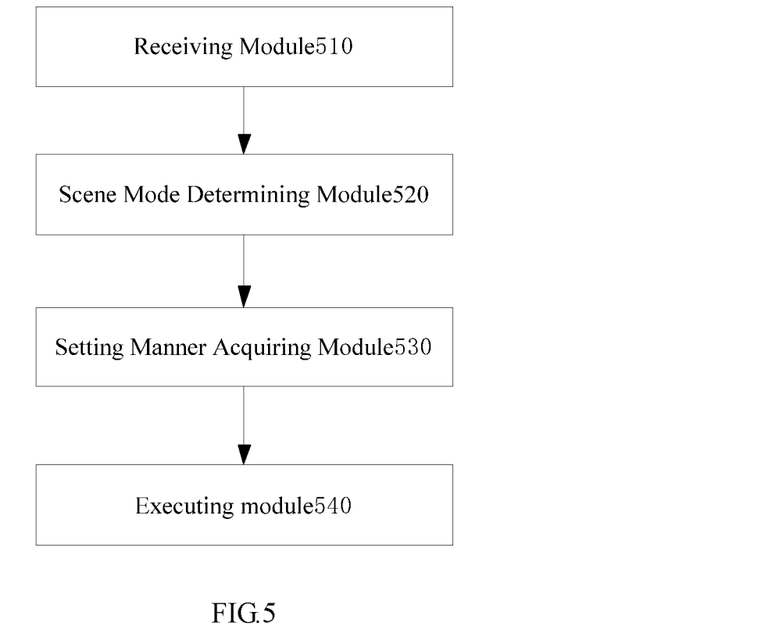
FIG. 5 is a block diagram of the terminal function setting device according to an embodiment of the present invention.

FIG. 5 is a block diagram of a terminal function setting device according to an embodiment of the present invention.

As shown in FIG. 5, the terminal function setting device comprises a receiving module 510, a scene mode determining module 520, a setting mode acquiring module 530 and an executing module 540.

The receiving module 510 is configured for receiving a current request for vehicle unlocking sent by a mobile terminal.

The scene mode determining module 520 is configured for determining to perform a scene mode of the current request.

The setting mode acquiring module 530 is configured for acquiring a terminal function setting manner under the determined scene mode.

The executing module 540 is configured for performing function setting of the mobile terminal according to the acquired terminal function setting manner.

Figure 6:
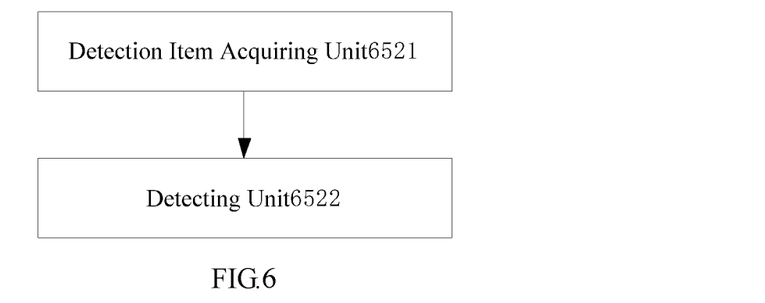
FIG. 6 is a block diagram of another embodiment of the scene mode determining module in FIG. 5.

As shown in FIG. 6, the scene mode determining module 520 may further include a detection item acquiring unit 6521 and a detecting unit 6522.

The detection item acquiring unit 6521 is configured for acquiring at least one detection item for determining the scene mode.

The detecting unit 6522 is configured for detecting based on a priority level of the detection item to determine the scene mode.

The detecting unit 6522 may detect each item sequentially or simultaneously, and comprehensively determine to perform the scene mode of the current request based on a detection result of each item.

For example, the scene mode determining module 520 may be configured for determining the scene mode based on a light intensity, when the light intensity is lower than or equal to a preset intensity threshold, the scene mode determining module determines the scene mode as a night mode.

For another example, the scene mode determining module 520 may be configured for determining the scene mode based on time, when the current time is a preset nigh time, the scene mode determining module determines the scene mode as a night mode.

Figure 7:
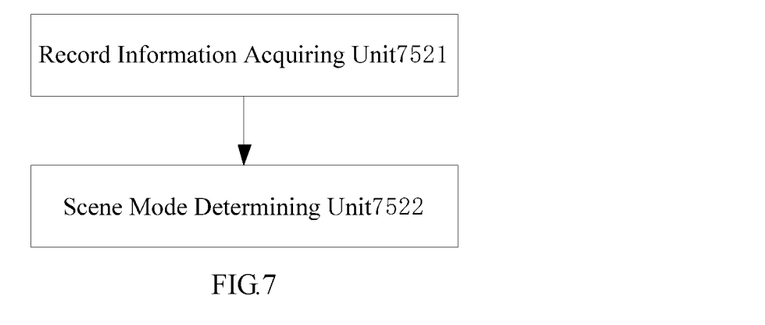
FIG. 7 is a block diagram of a third embodiment of the scene mode determining module in FIG. 5.

For another example, the scene mode determining module 520 may be configured for determining the scene mode based on a history record. As shown in FIG. 7, the scene mode determining module 520 or the detecting unit of the scene mode determining module 520 may further comprise a record information acquiring unit 7521 and a scene mode determining unit 7522.

The record information acquiring unit 7521 is configured for acquiring record information of vehicle unlocking performed by the mobile terminal, wherein the record information includes a vehicle unlocking time and a scene mode when a vehicle is unlocked.

The scene mode determining unit 7522 is configured for determining the scene mode based on a current time and the record information acquired by the recording information acquiring unit 7521.

Figure 8:
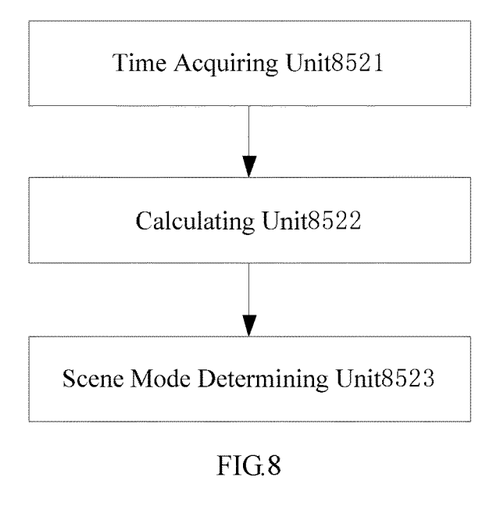
FIG. 8 is a block diagram of a fourth embodiment of the scene mode determining module in FIG. 5.

For another example, the scene mode determining module 520 may determine the scene mode based on a time interval. Thus, as shown in FIG. 8, the scene mode determining module 520 or the detecting unit of the scene mode determining module 520 may further comprise a time acquiring unit 8521, a calculating unit 8522 and a scene mode determining unit 8523.

The time acquiring unit 8521 is configured for acquiring a time when a function setting of the mobile terminal is performed last time as the last time.

The calculating unit 8522 is configured for calculating a time interval between a current time and the last time.

The scene mode determining unit 8523 is configured for, when the time interval is lower than or equal to a preset time threshold, taking a scene mode of the last request as the scene mode of the current request.

<Hardware Structure>

Figure 9:
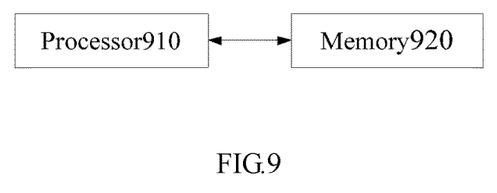
FIG. 9 is a block diagram of the hardware structure of a terminal function setting device according to an embodiment of the present invention.

FIG. 9 is a block diagram of a hardware structure of a terminal function setting device according to an embodiment of the present invention.

As shown in FIG. 9, in this embodiment, the terminal function setting device may include a memory 920 and a processor 910. The memory is configured for storing instructions for controlling the processor 910 to perform operations so as to perform any of the terminal function setting methods according to the present invention.

The memory 920 may include a high-speed random access memory, and may also include a nonvolatile memory, such as one or more magnetic storage devices, a flash memory, or other nonvolatile solid state memories.

<Mobile Terminal>

Figure 10:
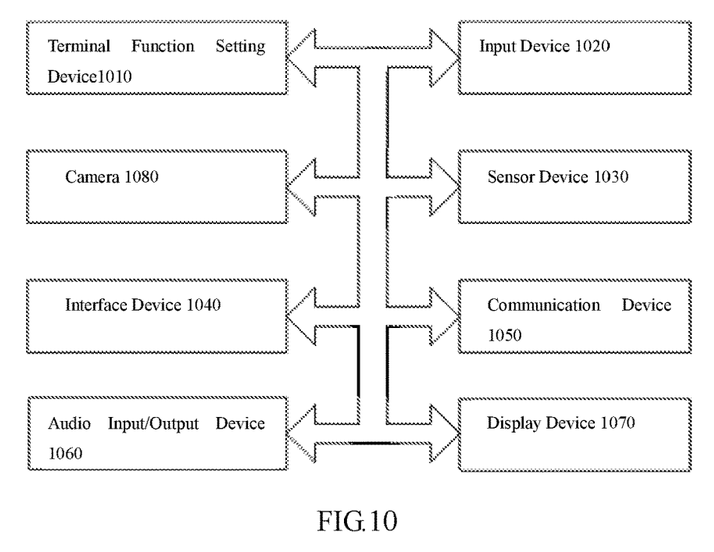
FIG. 10 is a block diagram of a mobile terminal according to an embodiment of the present invention.

FIG. 10 is a block diagram of a mobile terminal according to an embodiment of the present invention.

As shown in FIG. 10, the mobile terminal includes any of the terminal function setting devices according to the present invention, and is designated as 1010 in FIG. 10.

The mobile terminal may further include an input device 1020, a sensor device 1030, an interface device 1040, a communication device 1050, an audio input/output device 1060, a display device 1070, a camera 1080, and the like.

The input device 1020 may include, for example, a touch screen, a keyboard, etc.; a vehicle unlocking request sent by the mobile terminal is triggered through the input device 1020; and the code of a vehicle to be unlocked is input through the input device.

The sensor device 1030 includes, for example, an acceleration sensor, a gyroscope, a GPS tracker, a light sensor, and the like.

The interface device 1040 includes, for example, a USB interface and the like.

The communication device 1050 is capable of, for example, performing wired or wireless communication (through WIFI or Bluetooth).

The audio input/output device 1060 includes, for example, a speaker and a microphone.

The display device 1070 includes a display screen.

The camera 1080 includes at least one camera, and may be configured for collecting external real scenes, taking two-dimensional codes, and the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scene, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It is well-known to a person skilled in the art that the implementations of using hardware, using software or using the combination of software and hardware can be equivalent with each other.

It should be noted that the respective embodiments of the present description are described in a progressive manner, the focus of each embodiment illustrates the differences from other embodiments, and the same or similar parts among the embodiments may refer to one another. However, those skilled in the art should understand that the above embodiments may be used individually or in combination according to the needs. In addition, as the device embodiments correspond to the method embodiments, the description of the former is relatively simpler, and the related parts may refer to the corresponding parts of the method embodiments. The above-described device embodiments are only illustrative. The modules or units in these devices described may be or not physically separated.

It will also be appreciated that many variations of the above systems and methods are possible, and that deviation from the above embodiments are possible, but yet within the scope of the claims. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

The invention claimed is:

1. A terminal function setting method for vehicle unlocking, said method comprising the steps of:
   receiving a current request for vehicle unlocking sent by a mobile terminal;
   determining to perform a scene mode of the current request;
   acquiring a terminal function setting manner under the scene mode; and
   performing function setting of the mobile terminal according to the terminal function setting manner, wherein:
      the scene mode comprises a night mode, and a terminal function setting manner under the night mode includes activating a flashlight function of the mobile terminal; and
      the terminal function setting manner under the night mode further comprises a setting manner of camera parameters.

2. The terminal function setting method according to claim 1, wherein determining the scene mode of the current request comprises:
   acquiring at least one detection item for determining the scene mode; and
   detecting based on a priority level of the detection item to determine the scene mode.

3. The terminal function setting method according to claim 1, wherein determining to perform the scene mode of the current request comprises:
   determining the scene mode based on a light intensity, when the light intensity is lower than or equal to a preset intensity threshold, the scene mode is determined as a night mode, and a terminal function setting manner under the night mode includes activating a flashlight function of the mobile terminal.

4. The terminal function setting method according to claim 1, wherein determining to perform the scene mode of the current request comprises:
   determining the scene mode based on a time, wherein when a current time is a preset night time, the scene mode is determined as a night mode, and a terminal function setting manner under the night mode includes activating a flashlight function of the mobile terminal.

5. The terminal function setting method according to claim 1, wherein determining to perform the scene mode of the current request comprises:
   acquiring record information of vehicle unlocking performed by the mobile terminal, the record information including a vehicle unlocking time and a scene mode used when a vehicle is unlocked; and
   determining the scene mode based on the record information and a current time.

6. The terminal function setting method according to claim 1, wherein determining to perform the scene mode of the current request comprises:
   acquiring a time when a function setting of the mobile terminal is last performed as the last time;
   calculating a time interval between a current time and the last time; and
   when the time interval is lower than or equal to a preset time threshold, taking a scene mode of the last request as the scene mode of the current request.

7. A mobile terminal comprising a memory and a processor, wherein the memory stores instructions for controlling the processor to perform the terminal function setting method according to claim 1.

8. A terminal function setting device for vehicle unlocking, comprising:
   a receiving module configured for receiving a current request for vehicle unlocking sent by a mobile terminal;
   a scene mode determining module configured for determining to perform a scene mode of the current request, the scene mode comprising a night mode;
   a setting manner acquiring module configured for acquiring a terminal function setting manner under the scene mode, the terminal function setting manner under the night mode comprising: activating a flashlight function of the mobile terminal, and a setting manner of camera parameters; and
   an executing module configured for performing function setting of the mobile terminal according to the terminal function setting manner.

9. The terminal function setting device according to claim 8, wherein the scene mode determining module comprises a detection item acquiring unit configured for acquiring at least one detection item for determining the scene mode; and a detecting unit configured for detecting based on a priority level of the detection item to determine the scene mode.

10. The terminal function setting device according to claim 8, wherein the scene mode determining module is configured for determining the scene mode based on a light intensity, when the light intensity is lower than or equal to a preset intensity threshold, the scene mode determining module determines the scene mode as a night mode, and a terminal function setting manner under the night mode comprises activating a flashlight function of the mobile terminal.

11. The terminal function setting device according to claim 8, wherein the scene mode determining module is configured for determining the scene mode based on a time, when a current time is a preset night time, the scene mode determining module determines the scene mode as a night mode, and a terminal function setting manner under the night mode comprises activating a flashlight function of the mobile terminal.

12. The terminal function setting device according to claim 8, wherein the scene mode determining module comprises:

a record information acquiring unit configured for acquiring record information of vehicle unlocking performed by the mobile terminal, the record information comprising a vehicle unlocking time and a scene mode in which a vehicle is unlocked; and a scene mode determining unit configured for determining the scene mode based on the record information and a current time.

13. The terminal function setting device according to claim 8, wherein the scene mode determining module comprises:

a time acquiring unit configured for acquiring a time when a function setting of the mobile terminal is last performed as the last time;

a calculating unit configured for calculating a time interval between a current time and the last time; and a scene mode determining unit configured for, when the time interval is lower than or equal to a preset time threshold, taking a scene mode of the last request as the scene mode of the current request.

* * * * *